United States Patent
Balakrishnan et al.

(10) Patent No.: US 6,658,450 B1
(45) Date of Patent: Dec. 2, 2003

(54) METHOD AND SYSTEM FOR MEMORY RESIDENT TRANSIENT STORAGE OF DATA ASSOCIATED WITH A PLURALITY OF COLLABORATING COMPUTER PROCESSES

(75) Inventors: Govind Balakrishnan, Round Rock, TX (US); Peter Bunyan, London (GB)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/240,207

(22) Filed: Jan. 29, 1999

(51) Int. Cl.[7] .............................................. G06F 15/16
(52) U.S. Cl. ........................ 709/106; 709/238; 709/240
(58) Field of Search ................................ 709/100, 106, 709/310, 313, 315, 318, 330–332, 238, 240, 243, 244

(56) References Cited

U.S. PATENT DOCUMENTS

| | | | | |
|---|---|---|---|---|
| 5,579,309 A | * | 11/1996 | Totzke ........................ | 370/58.2 |
| 5,794,006 A | * | 8/1998 | Sanderman ................. | 709/100 |
| 5,819,243 A | | 10/1998 | Rich et al. | |
| 5,862,330 A | | 1/1999 | Anupam et al. | |
| 5,872,973 A | * | 2/1999 | Mitchell et al. ............ | 709/100 |
| 5,991,796 A | | 11/1999 | Anupam et al. | |
| 6,332,195 B1 | * | 12/2001 | Green et al. ................ | 713/201 |
| 6,363,435 B1 | * | 3/2002 | Fernando et al. ........... | 709/318 |

* cited by examiner

Primary Examiner—Emanuel Todd Voeltz
(74) Attorney, Agent, or Firm—Blakely, Sokoloff, Taylor & Zafman, LLP

(57) ABSTRACT

A memory-resident stored system for storing data associated with a plurality of collaborating computer processes, wherein selected ones of the computer processes collaborate with other ones of the collaborating computer processes. Included instructions for dynamically establishing a hierarchical organization relating to a plurality of nodes. Each of the nodes establishes a path with at least selected ones of the plurality of collaborating computer processes. Instructions operate to describe a plurality of the paths according to the hierarchical organization for generating a plurality of hierarchical path descriptions between selected ones of the plurality of nodes and the at least selected ones of the plurality of collaborating computer processes. Instructions also accommodate communicating with the communications network server, the plurality of hierarchical paths descriptions for permitting transient storage of data in describing the path between the nodes and the plurality of collaborating computer processes.

65 Claims, 6 Drawing Sheets

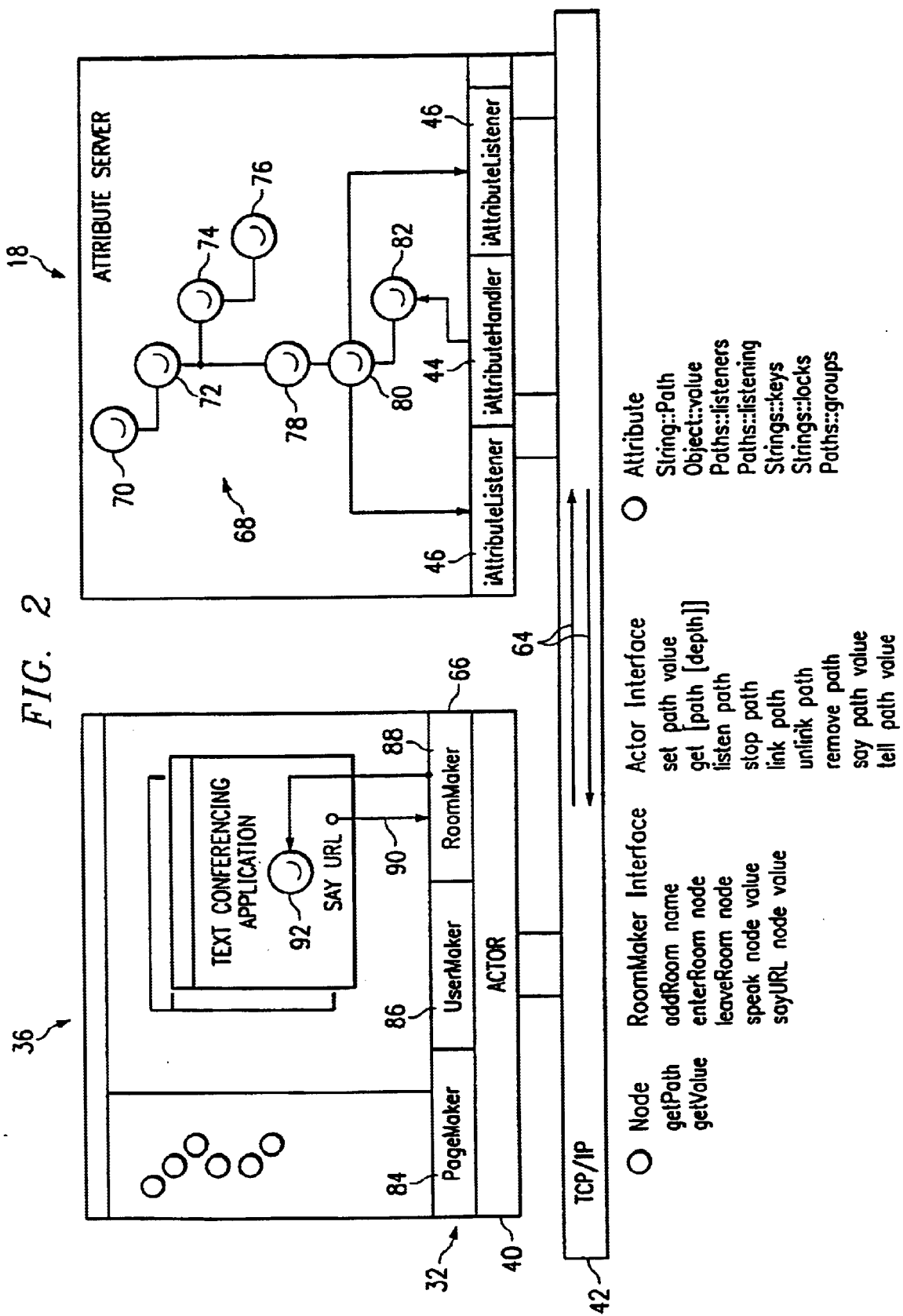

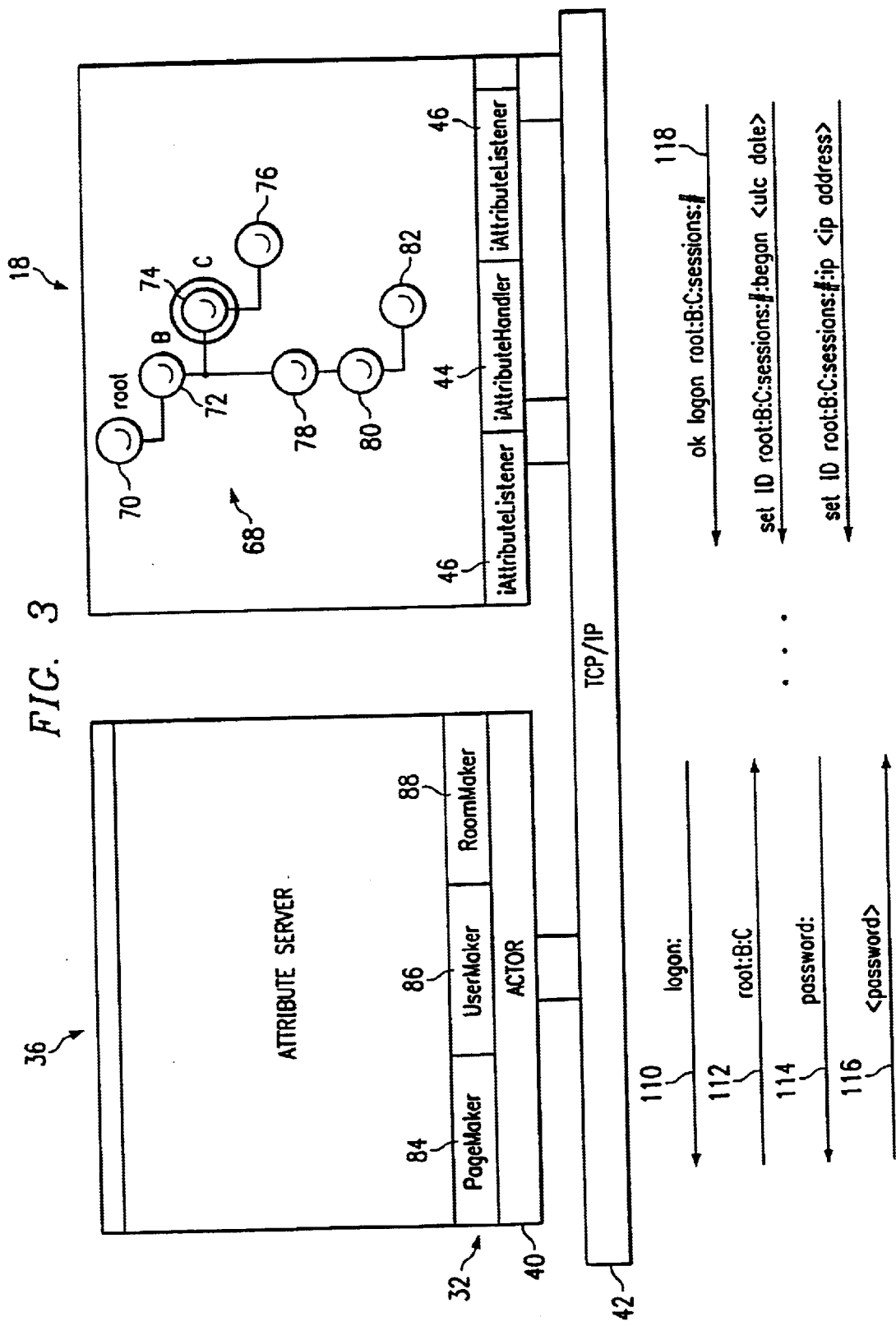

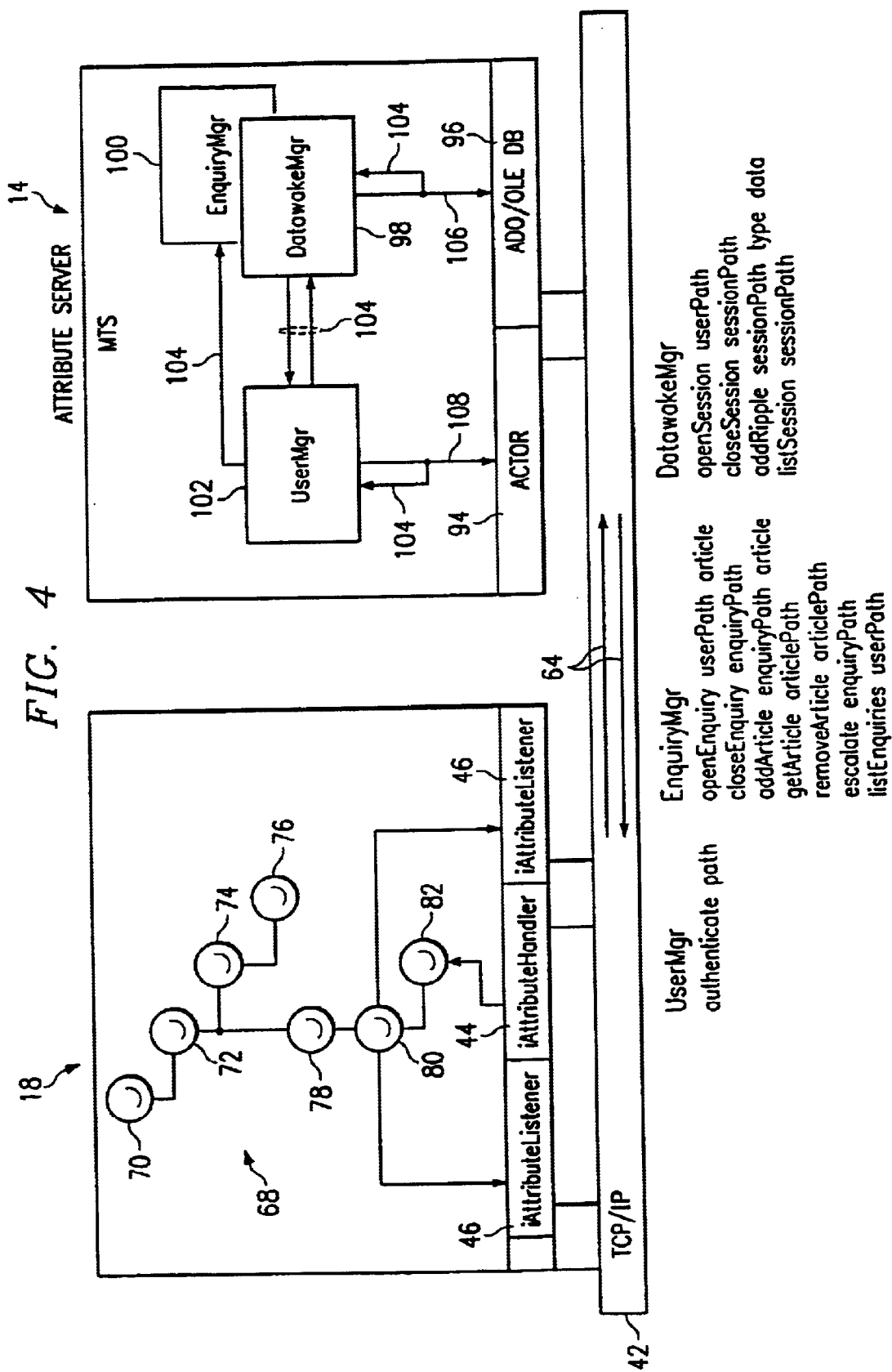

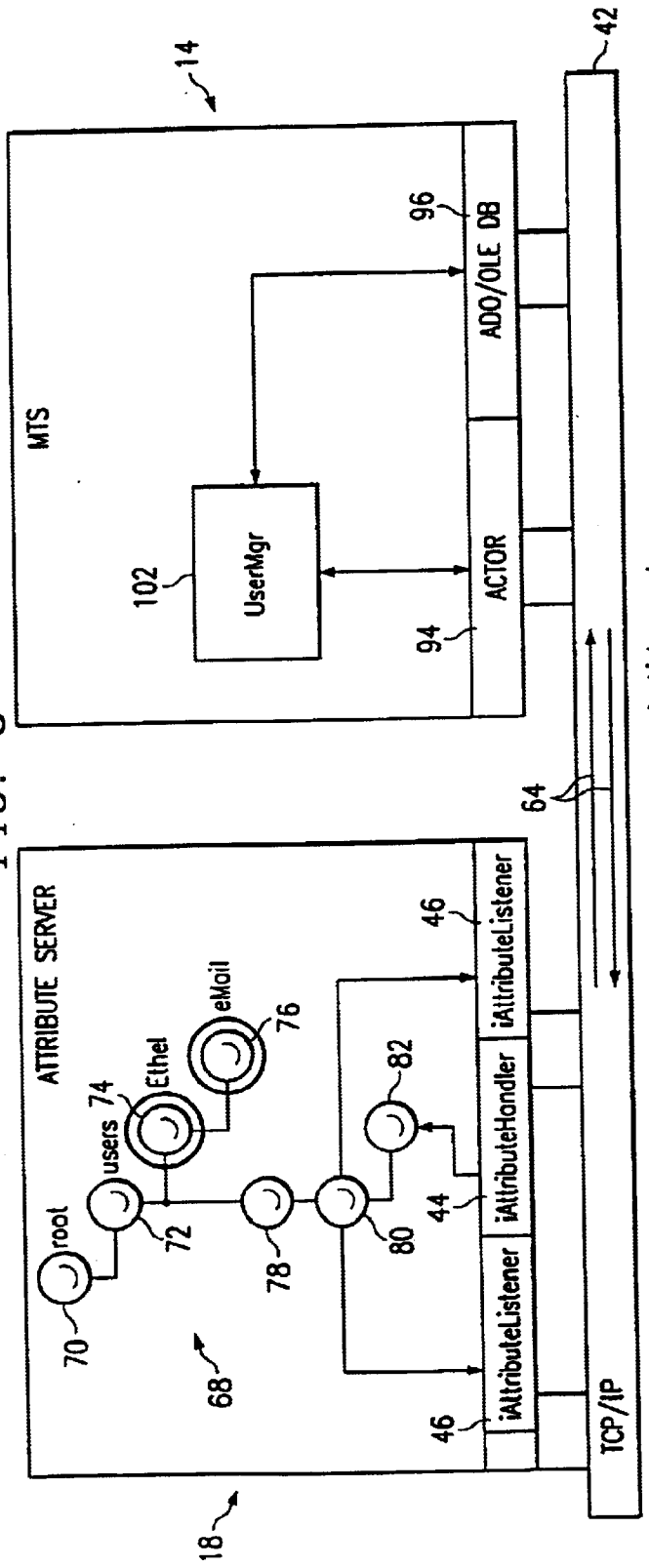

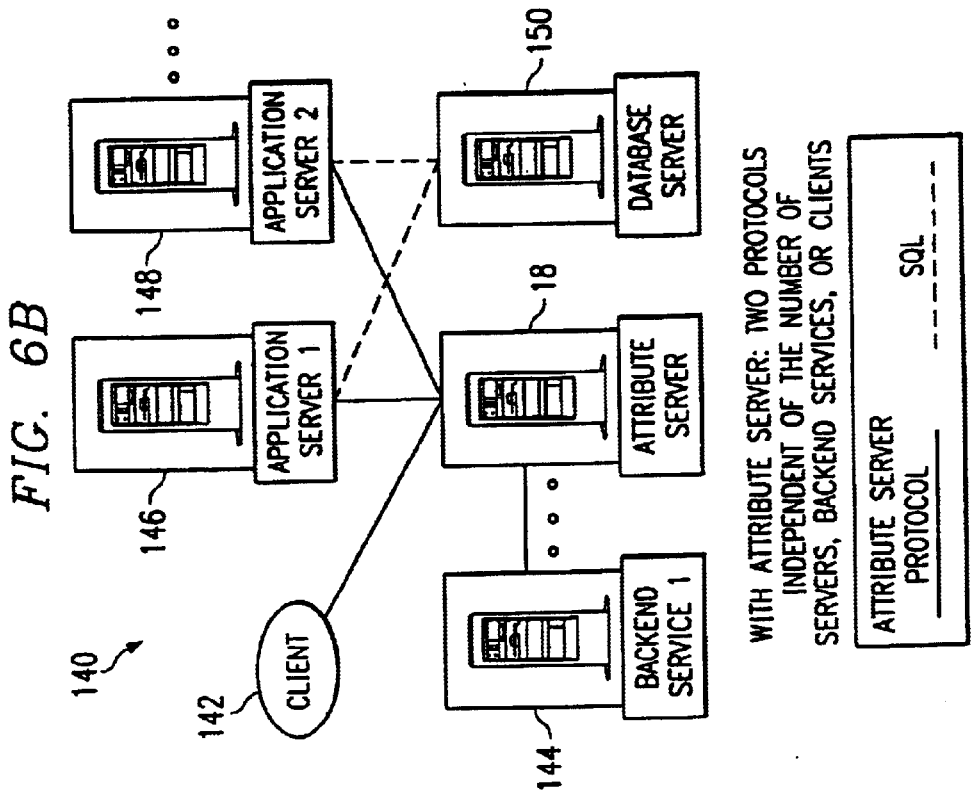
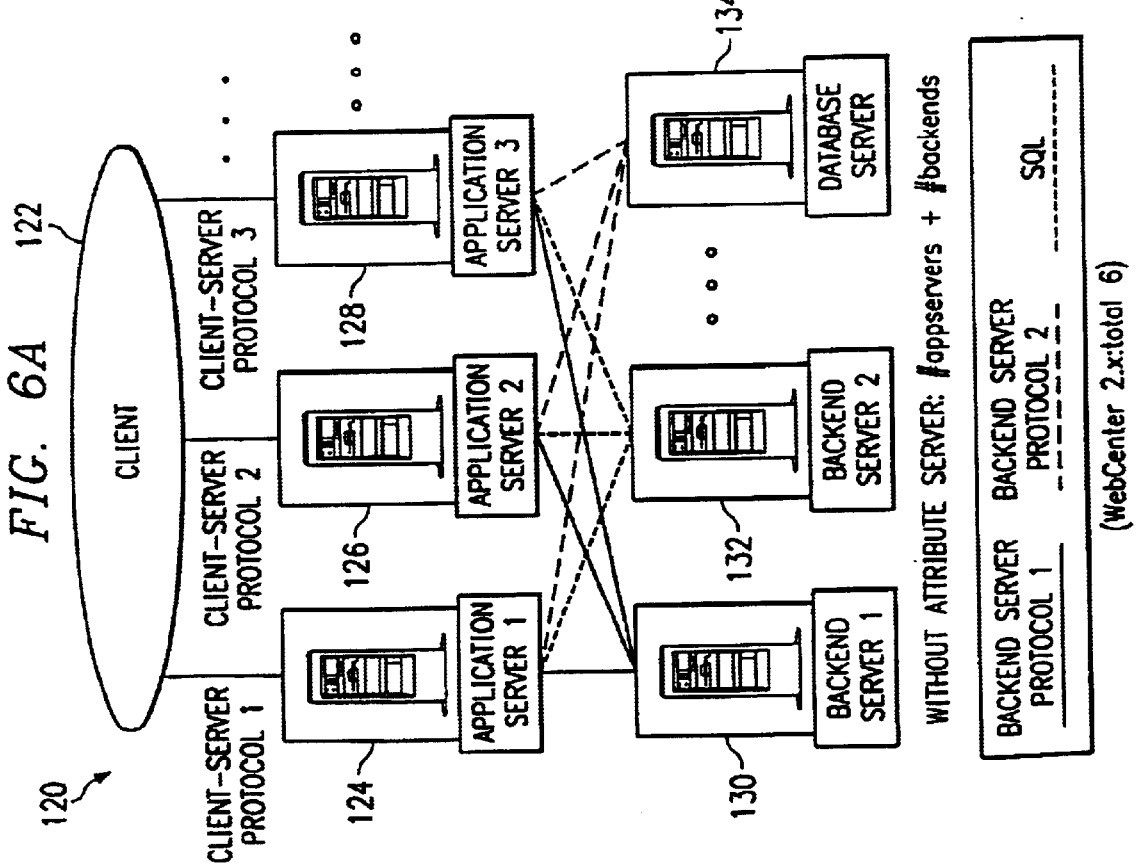

METHOD AND SYSTEM FOR MEMORY RESIDENT TRANSIENT STORAGE OF DATA ASSOCIATED WITH A PLURALITY OF COLLABORATING COMPUTER PROCESSES

TECHNICAL FIELD OF THE INVENTION

The present invention relates in general to the field of computer software, and more particularly to the storage of data relating to the operation of computer processes. Even more particularly, the present invention relates to a memory-resident storage method and system for permitting transient storage of data associated with a variety of collaborating computer processes, even when the collaborating computer process are operating on different computers at different locations, and even when the collaborating computer processes may or may not have associated persistent storage mechanisms.

BACKGROUND OF THE INVENTION

On the Internet, as well as with other on-line networked computer systems, a given application may provide a service to one or more users, while collaborating with many different computer processes on many different computers. The different computer processes may be on different computers and even at different locations. For this reason, in this situation the traditional concept of the client or a server, or a server amongst servers is not relevant. This is true because no one processor will possess the entire state of the application satisfying the needs of the user or users.

One problem related to the above situation occurs when the collaborating computer processes operate on different processors at different times concerns properly and appropriately notifying either the user or one of the collaborating computer processes when a certain event has occurred. When computer processes collaborate with one another, there is a desire to permit a first computer process to assign to a second computer process the job of completing a certain task. After the second computer process accepts the assignment, the first computer process may disengage with the second computer process. The second computer process may then complete the desired assignment. Upon completing the assigned operation, the second computer process should then notify the first computer process that its assigned task has been completed.

Presently, collaborating computer processes do not provide this form of notification for HTTP or Web-based computer processes, but are highly transaction-oriented. The computer programs of these types cannot work with a server to "push" to a collaborating computer process something that another computer process did not originally request. For example, in the Microsoft® Transaction Server® environment, server push applications are not feasible. Although Microsoft® Transaction Server® applications may provide some form of active channel, currently they do not provide any form of notification or server push function. In addition, no other known methods of collaborating among computer processes in an on-line environment provide this desired type of notification.

Another limitation of existing technologies is that they do not provide a way to determine the addresses of the different processes that may provide different operations for collaborating computer processes. This lack of addressing capability prohibits associations between the server and the associated collaborating computer processes. In such environments, communications are usually point-to-point and protocols are defined on an ad hoc basis. With such a structure, when collaborating processes attempt to communication with one another, there is first the need to determine the protocol or the method in which the two collaborating computer processes will talk to one another. Because of this, there is often a lack of uniformity in the communications that might occur between the collaborating computing processes. This complicates the interface between the collaborating computer processes and may ultimately inhibit or restrict their ability to collaborate.

Another limitation associated with traditional methods and systems for storing data in an HTML or Web-based system is that the systems store information in a flat manner. Thus, in identifying a recipient for a message, such a system simply looks for a user with the desired name and sends the message directly to that user.

Still another limitation associated with conventional methods and systems for permitting computer processes to collaborate concerns the inability to determine all of the potential computer processes that may desire to collaborate with one another. With conventional methods of storing data associated with collaborating computer processes, there is no practical way to usefully detect or meaningfully "listen" to which computer processes are collaborating. This lack of ability to listen inhibits fully using the collaborating computer processes during their collaboration.

Yet another limitation associated with storing data relating to collaborating computer processes arises from the fact that traditional methods use databases for a "persistent" store of data. With persistent storing of information, the data survives in a magnetic or other physical form of memory after the computer processes cease to collaborate. For many applications, however, persistently storing data is inefficient and lacks the dynamic characteristics associated with a "transient" storage of data that accompanies the collaborating computer processes. Moreover, for the persistent store of data a storage mechanism must be designed and registered ahead of time for use by the collaborating computer processes. Clearly, this restricts the flexibility of systems that can only store data persistently.

Conventional systems also suffer from the requirement to identify, register and install all of the potential users of or listeners to the collaborating computer processes. This is true even though listening may occur at a point substantially after the initiation of computer process collaboration. With conventional memory-resident storage method and systems, however, no practical way exists to transiently create a listening connection from the server to the collaborating computer processes as the computer processes dynamically collaborate with one another.

Another problem with conventional data storage mechanisms that exist for collaborating computer processes relates to the expense and time necessary to distribute the user-side collaborating technology to users.

Still another limitation exists with conventional solutions relating to the desire for collaborating computer processes. Presently, a number of mechanisms exists for real time communication on the network, such as the Internet. This includes chat products, instant messaging products, and other products that are disparate and that move events in small bits of information from one place to another. These solutions or mechanisms are controlled in different ways and administered in different ways. This creates the problem of expense and complexity in maintaining the different incompatible communication schemes.

Still another limitation associated with conventional methods of permitting computer processes to collaborate with one another associates with the use of network resources dedicated on each end of the communication link between the collaborating computer processes. In traditional applications, two computer processes seeking to collaborate with one another must establish a socket or network resources that permit the communication between the two computer processes. When numerous computer processes desire to collaborate with one another, the requirement that each set of processes consume a socket, can be very expensive in terms of network resources. Moreover, the necessary handshakes, failure preparedness and other requirements for the dedication of network resources for this collaboration is expensive and consumes substantial resources, depending on the number of computer processes with which collaboration is desired.

Therefore, there is a need for a system and method that permit describing events that occur when numerous computer processes collaborate with one another, even when the computer processes may reside on different computers and at different locations.

There is the need for a system that provides notification in the event of a postponed closure of an operation.

There is a further need for a system that overcomes the transactional or synchronous requirement existing in HTTP and Web-based computer processes when numerous computer processes collaborate with one another to achieve synergistic operation.

A further need exists for a method and system that permit the transient storage of data when numerous computer processes collaborate at different locations and on different computers with one another.

Another need exists for a method and system that permits the storage of data associated with collaborating computer processes that does not require the anticipation of all potential listeners or users of the collaborating computer processes.

There is a further need for a method and system that overcomes the uniformity requirements of persistent storage technologies such as relational databases that must be designed and registered ahead of the intended use.

A need also exists for a method and system for storing data when numerous computer processes collaborate with one another for reconstituting the transient state, from persistent storage, of the user or other entity that at an earlier time collaborated with one or more computer processes and that subsequently returns to collaborate with the computer processes.

A need exists for a method and system that permit the storage of data associated with collaborating computer processes to exchange event notifications and other small bits of information that many solutions, such as chat, instant messaging, presence protocol (e.g. "buddy lists"), and other solutions require.

Still another need exists for a method and system that stores data transiently when numerous computer processes collaborate with one another, but which uses minimal network resources, or sockets. Related to this need to minimize the use of network resources for transient storage is the need to reduce the requirements for hand shakes and failure preparedness and recovery functions associated the use of network resources.

SUMMARY OF THE INVENTION

In accordance with the present invention a memory resident storage method and system for storing data associated with the plurality of collaborating computer processes is provided. This substantially eliminates or reduces disadvantages and problems associated with previously developed methods and systems for storing data when computer processes collaborate with one another, such as persistent storage methods and systems existing in known computer processes.

More specifically, the present invention provides a memory-resident transient data storage system for storing data associated with the plurality of collaborating computer processes. When selected ones of the computer processes collaborate with other ones of the collaborating computer processes, the present invention provides instructions for dynamically establishing a hierarchical organization relating to a plurality of nodes. Each of the plurality of nodes establishes a path with at least selected ones of the plurality of collaborating computer processes. Instructions of the present system describe a plurality of the paths according to the hierarchical organization for generating a plurality of hierarchical path descriptions between selected ones of the plurality of nodes and be at least selected ones of the plurality of collaborating computer processes. The invention further includes instructions for communicating with a communications network server the plurality of hierarchical path descriptions. This permits the transient storage of data that describes the path between the nodes and the plurality of collaborating computer processes.

With the present invention, each datum is stored in a well-defined object. Each such object is identified by a name, or "path", given by the position of the object in the hierarchical organization. Said collaborating processes may exchange information asynchronously by setting and getting the data stored in the plurality of objects.

With the present invention, events occur at each path. Events are caused by originators, each of which is associated with a path. Because events occur on a path, the method and system of present invention permit determining the originator of a particular event. This provides information on the originator, what the originator acted on, and the action itself. In essence, therefore, the present invention identifies, through the creation of an event at a particular path, what the originator said or did, and from where the originator made the statement or took the action.

With the establishment of paths between the collaborating computer processes, there is the need to identify a computer process for which listening for events is desired. With the present invention, the object may not even exist at the time the desire of listening is established and listening is attempted. However, the act of requesting the system to listen to a named path will cause the path to be created.

A technical advantage of the present invention is that every process has the ability to be dynamically identified as a path, with each of the paths being self-describing.

Another technical advantage that the present invention provides is the ability to listen to a path and hear events asynchronously on that path. Therefore, the present invention avoids the requirement to ask for notification of whether a task has been completed. This eliminates "polling," i.e. repeatedly querying a collaborating computer process of whether an event has occurred. With the present invention, a server, and not the process requiring the notification, will initiate a call back to the process to notify the process of the event having occurred.

Still another technical advantage provided by the present invention is presenting a hierarchical organization for the transient storage of data, as opposed to a flat naming structure that presently dominates Internet and other network applications.

A technical advantage that the present invention also provides is asynchronous listening for events. This eliminates the need for consistently querying whether an event has been completed. The asynchronous listening feature permits the process to which an operation has been referred to respond asynchronously to the referring operation that the event has in fact occurred.

Still other technical advantages of the present invention include a common protocol, reducing and simplifying protocol handling, fault-recovery, and administration.

With the present invention, paths may be created without knowing in advance who will desire to query the path's data value, or send events to that path, or listen to events on that path. With this technical advantage, the present invention posses increased flexibility in operation that is substantially different from prior methods of storing data for collaborating computer processes.

Another technical advantage of the present invention is that listening to events exploits the organizing effects of the hierarchical name space. This permits the ability to propagate events up the hierarchical structure of information. The hierarchical structure permits listening to aggregations at the lower levels of the hierarchical structure. Accordingly, any event occurring beneath the node to which listening has been directed will be heard at the node for which listening has been directed.

The present invention also provides the technical advantage of a "tell" function for broadcasting down the hierarchical structure so that every node beneath the node that is telling of an event will hear of the event.

Still another technical advantage of the present invention is the present invention provides a broadcast method so that more than one process can listen, and each hears the entire event. The originator of the event need not determine who is listening or on which level listening is occurring. By virtue of the organized hierarchical structure that the present invention provides, the present invention avoids the disorganized point-to-point communications that occur in traditional or conventional data storage methods and systems.

Another technical advantage of the present invention is that when a set of computer processes begins to collaborate, all of the processes that desire to listen to the various paths reconstitute the hierarchical structure and state that would have existed in the presence of a persistent store. The present invention provides a transient store in which the processes may "set" what the other processes desire to "get" or "listen" to in creating necessary paths for transiently storing data. Because some processes "listen" and other processes "say" events, a reconstituted state arises dynamically within the server as the plurality of cooperating processes create the paths they require. This provides a distributed, dynamic alternative to the use of a persistent store of the data, and permits the transient storage of data outside the computer processes that would otherwise require data to be persistently stored.

Yet another technical advantage that the present invention provides is a flexible system that permits tapping into the collaborating computer processes after the initiation of the collaboration for reporting, administration, dynamic process monitoring, and other functions. The present invention makes it easier to perform operations and collaborations in a uniform manner than conventional ad hoc methods of defining protocols for communications that occur during computer process collaboration.

The present invention takes technical advantage of the fact that listening is desired of a given computer process. With the present invention, listening generates part of the data that setting values simply finishes off.

The present invention also provides the technical advantage of permitting the initialization of a transient store in coordination with persistent store mechanisms such as a relational database. This is effected by using the hierarchical organization to aggregate like conceptual entities, and having service processes (called "Managers" in the specific embodiment) "listen" at a higher level in the hierarchy. The creation event for the entity is thus heard by one or more managers, which reconstitute the entity's transient state from persistent storage. Thus, the method and system of the present invention promote a synergistic combination of both transient and persistent storage of data as appropriate with a variety of computer processes seek to collaborate with one another.

The present invention also provides the technical advantage of a uniform naming convention for listening to the different collaborating computer processes. With the present invention, the collaborating computer processes simply become different applications of a single mechanism with conventions that eliminate duplicative administrative and streamline usage.

A technical advantage that the present invention provides is a path structure that permits requesting service from a transient store mechanism in a very lightweight and effective way. This is of particular value when employing very lightweight objects such as those supported by the Microsoft® Transaction Server® (MTS). The structure of the present invention reuses a single protocol to obtain information concerning the completion of an event with collaborating computer processes. A path that calls a particular node or collaborating computer processes can use the same path or a related path to notify the relevant processes of the event completion. Thus, the present invention, while not replacing persistent store technology, is synergistic and supplementary for permitting the transient store of data for the computer process collaboration.

Yet another technical advantage that the present invention provides is the use of a single protocol that requires only one socket, and therefore only one failure preparation or recovery resource for collaboration among a large number of collaborating computer processes. As a result, the present invention provides much more efficient storage of data arising through the collaboration of a plurality of computer processes, as well as increased efficiency associated with collaboration. The present invention requires only one socket because communications occur through a single connection. The present invention permits the routing of connections to the appropriate place or computer process because of the naming structure the path convention of its uses. Thus, two machines communicating with one another in providing collaborating computer processes only require a single communications link. This would be true for many computer processes collaborating with one another.

Another technical advantage of the present invention is its ability to take information that is stored in a database in a highly stylized fashion and avoid the need for the database to save transient data. By using the Microsoft Transaction Server, or similar server, the present invention employs light-weight objects. This permits flexibly scaling the systems of collaborating computer processes using the present invention, as well as storing small amounts of information in a rapidly accessible and flexible manner. Accordingly, information flows quickly and effectively without putting an excessive load on the persistent store.

BRIEF DESCRIPTION OF THE DRAWINGS

For a more complete understanding of the present invention and advantages thereof, references are made to the following description taken in conjunction with the accompanying drawings in which like reference numerals indicate like features and wherein:

FIG. 2 illustrates operations of the transient storage system with an exemplary "sayURL" function according to the teachings of the present invention;

FIG. 3 depicts a manager connection operation occurring in association with the transient data storage functions of the present invention;

FIG. 4 conceptually presents the identification of a process that is identified with a path according to the present invention;

FIG. 5 graphically describes the initialization from a file function that the present invention provides; and FIG. 6 explains pictorially the advantage of reduced protocol count and simplified interfaces that the present invention makes possible.

FIGS. 6A and 6B illustrate one technical advantage of the present invention that relates to the significantly improved communications made possible by the present invention. In FIG. 6A appears client-server environment 120 of a more conventional organization and structure that includes a client 122 that communicates with a collection of application servers, including, for example, application servers 124, 126, and 128 using separate client-server protocols 1, 2, and 3, respectively. Each of application servers 124, 126, and 128 communicate with each of a number of backend servers, such as server 130, and backend server 132, and with database server 134 using potentially separate backend server protocols 1 and 2 and SQL®.

FIG. 6B, on the other hand, shows client-server environment 140, in which client 142 communicates with attribute server 18 of the present invention. Attribute server 18 may communicate with backend server 144, as well as application servers 146 and 148 using a single protocol. Application servers 146 and 148 communicate with database server 150 using SQL® protocol.

DETAILED DESCRIPTION OF THE INVENTION

Figure 1:
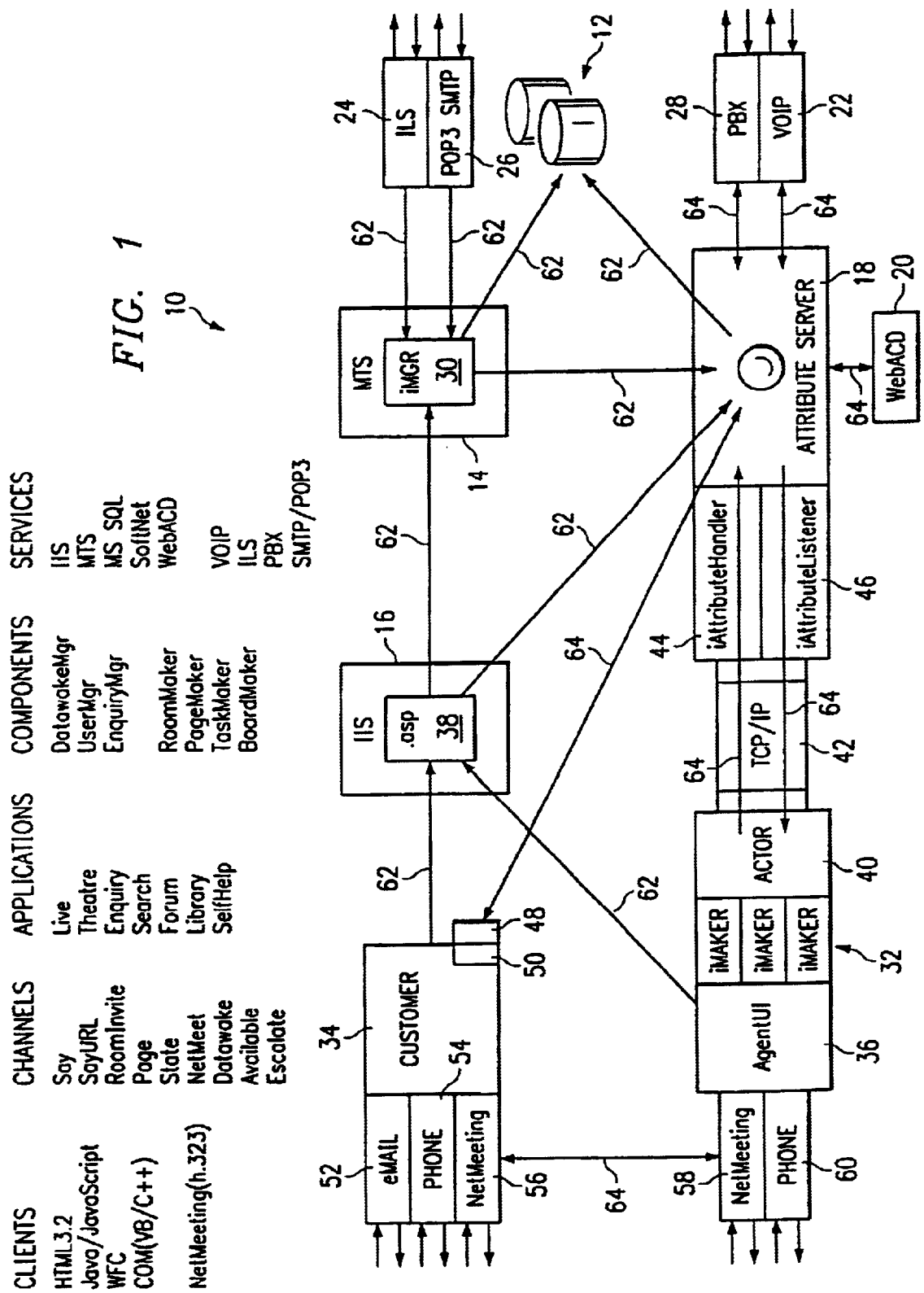
FIG. 1 shows a conceptual view of a number of computer processes collaborating with one another and using the teachings of the present invention.

Preferred embodiments of the present invention are illustrated in FIGUREs wherein like numerals are used to refer to like in corresponding parts of the various drawings.

FIG. 1 shows a conceptual view of a number of computer processes collaborating with one another and using the teachings of the present invention, and establishing thereby collaborating computer processing environment 10. Collaborating computer processing environment 10 associates with databases 12, which are installed and configured as persistent storage devices. In collaborating computer process environment 10, a variety of clients, channels, applications, components, and services work together to provide a robust communications platform to a user. Services that collaborating computer processing environment 10 may include are a web server, such as Internet Information Service (IIS) 16, Microsoft® Transaction Server® (MTS) 14, Microsoft SQL Server® (MS SQL) database application 12, Acuity™ Attribute Server™ (a Acuity Corporation trademark referring to the transient storage system of the present invention) 18, (hereinafter referred to as attribute server 18), and Acuity Corporation's WebACD® service 20, which provides an automatic call distribution function.

MTS 14 operates as a distributed application server that receives components such as the DataWakeMgr, the UserMgr, and the EnquiryMgr and may distribute them over many computers. Components that may be mounted within MTS 14 are objects that store information in database 12. Each of the services indicates a link forward to the service. WebACD 20 will respond to events from the attribute server of the present invention.

The voice-over-IP (VoIP) connection provides a gateway to voice calls that may be established over a TCP/IP network. VOIP service 22 represents a process that monitors a VOIP gateway. The service in VoIP service 22 broadcasts the events that occur on the gateway into attribute server 18 of the present invention, thereby providing to collaborating computer processing environment 10 knowledge of events occurring in the associated VoIP gateway.

The functions of ILS® service 24 may also be provided by alternative services known as LBAT®, X500®, or a similar service which facilitates obtaining information on other users and services on the Internet. IIS service 24 allows describing what sorts of services an environment such as collaborating computer processing environment 10 can support. These may include, for example, descriptions of the protocols needed to communicate with the user. ILS® service 24 allows connections to users and makes their being connected known to the rest of collaborating computer processing environment 10. This permits other users to talk to the connected user.

Because of ILS® service 24, instead of talking through a server, users may talk directly to one another. If a user is connected to ILS® service 24, the present invention will notify MTS® service 14. Attribute server 18 can then respond to the new user's presence. The present invention, therefore, provides a process for monitoring ILS® for keeping the rest of collaborating computer processing environment 10 informed of users connecting to the MTS® service 14.

POP3 is a protocol for receiving eMail from an eMail server. SMTP is the protocol for transmitting eMail into an eMail server. The POP3/SMTP service 26 represents a process of the present invention for monitoring an eMail server and providing a gateway to eMail service. This permits users to transmit eMail from the collaborating computer processing environment 10 to an eMail server.

PBX service 28 represents a process that monitors a traditional telephone exchange. Like the other services in FIG. 1, PBX service 28 monitors the traffic that occurs on the associated processors they are monitoring.

Collaborating computer processing environment 10 of the present invention supports two types of components. The first type of component is represented by the DataWakeMgr, UserMgr and EnquiryMgr components that reside in MTS® service 14, as iMgr component interface 30 depicts. These components provide business or application logic supporting how notification of events that occur will be routed and handled in collaborating computer processing environment 10. In this process, some information will be saved to database 12, some information will be broadcast through attribute server 18, and some information may be packaged and returned from database 12 to other services like ILS® service 24, which will request of DataWakeMgr where this user has been. In response, DataWakeMgr will ask database 12 to present results to IIS® service 16.

In FIG. 1, the use of the lower case prefix "i" represents an interface for expressing the objects possible with the present invention, but does not prescribe how the object's functions must be performed. Instead, the individual component will possess the enabling instructions that permit a given component to function. Therefore, designating an interface as an iMgr or iMaker defines a set of rules to which the component conforms, but the remaining aspects of the instructions for performing a set of functions is controlled by the component developer. This permits generating a family of "pluggable" components.

The RoomMaker, PageMaker, TaskMaker and Board-Maker components, on the other hand, represent components which may be stored in MTS® service 14, but which may also be downloaded and housed on the client, as iMaker objects 32 indicate. The difference between, Customer object 34 and AgentUI object 36 is that iMaker objects 32 may be installed at AgentUI object 36, whereas Customer object defers to IIS® service 16 and MTS® service 14 for the iMakers to perform the associated iMaker tasks. In the present embodiment, the iMakers may be Java® objects which are then loaded into MTS® service 14 or downloaded to AgentUI object 36. These are business objects that direct how to use a network operating as collaborating computer processing environment 10.

Within IIS® service 16 are ".asp" pages 38. The .asp pages 38 are HTML pages of a Web site and have dynamic content that includes both hierarchical and flat content. Other HTML-embedded programming mechanisms such as JavaScript or CGI could substitute for .asp. Once collaborating computer processing environment 10 is loaded and the various channels, applications, components, and services are connected, collaborating computer processing environment connects the actors, i.e., customer object 34 and AgentUI object 36 to Acuity® Attribute Server 18 of the present invention. This process may begin with AgentUI object 36, which may connect to Acuity® Attribute Server 18 by loading, either dynamically from the Internet or from a local hard disk, a client that includes actor object 40. The actor object connects to Acuity® Attribute Server through TCP/IP protocol 42. Thus, upon providing actor object 40 the TCP/IP address of the network for which a connection is desired, actor object 40 connects iAttributeHandler 44 and iAttributeListener 46 with the appropriate addresses. Upon connecting actor 40 through iAttributeHandler 44 and iAttributeListener 46 to attribute server 18, the present invention provides an attribute handler that permits AgentUI object 36 and Customer object 34 to act as an Attribute-Handler 44. Actor 40 will listen as an iAttribute Listener 46 and will be represented within attribute server as a path.

Once the connection between Actor object 40 and attribute server 18 is made, the AgentUI 36 can designate the desired functions that will be provided to Actor 40. This may include, for example, at iMaker objects 32, a RoomMaker object, a TaskMaker object, and perhaps a BoardMaker object. When these objects are provided to Actor 40, Actor 40 also receives indication of listening interests for other computer processes for which Actor 40 should listen. Attribute server 18 then provides events that give Actor object 40 data for the respective iMakers 32 that relate to their respective processes.

The operation of the present invention may be more easily understood through the following example. Suppose that an AgentUI 36 logs on to create Actor object 40 for designating the agent's identity. The agent will then log on to attribute server 18, and install a PageMaker component in MTS® service 14. MTS® service 14 then may receive and send pages to attribute server 18 and to other Customers and AgentUI objects 36 that may connect with attribute server 18.

The shaded objects 48 and 50 at Customer object 34 in FIG. 1 describe the connections that the present invention makes possible. Shaded objects 48 and 50 represent that the customer object 34 possesses a structure similar to that of AgentUI object 36 that connects with attribute server 18. Thus, shaded object 50 relates to iMakers 32 of AgentUI 32, and shaded object 48 relates to the iAttribute listener in the darker gray.

The iAttribute notation implies that any object can listen to events from an attribute as long as it implements this interface. By requiring that the interfaces connect to attribute server 18, a desired flexibility can be achieved for implementing instructions for various primitive datatypes (numbers, strings, etc). As a result, the objects of the present invention are not restricted to only Java® objects. Instead, the objects may be implemented the interfaces in C++, COM® or in any other similarly capable programming language. These components could then be plugged directly into attribute server of the present invention. By permitting the declaration of an iAttributeHandler, the present invention provides the freedom to change the functionality of iMaker objects 32.

Applications are made available to a user when the user accesses a Website supported by the present invention for achieving a result that collaborating computer processing environment 10 makes possible. By making accessible to the user collaborating computer processing environment 10, the present invention provides interactivity to a variety of applications that communicate with users using, for example, an automatically refreshing Website that can learn a user's preferences or other facts that make computer process collaboration a truly value-added environment.

Different applications that the present invention may provide as a suite of collaborating computer processes may include, for example, a "Live" application that presents a live marketplace simulating an actual marketplace. Also a "Theatre" application may be provided in which the user may engage in multimedia and multisensory performances presented according to the learned preferences of the user, which learning may take place as the user interacts with a collaborating computer processing environment 10, such as a Website. Such Live and Theatre applications may be unstructured to some measure for allowing users to make their own connections, as they desire. For example, with the Theatre application, the site may operate as an auditorium in which many users may listen passively to a select group of active participants; a one-to-many or few-to-many relationship, instead of a many-to-many relationship.

The Enquiry application allows a user to go to a Website and keep a history of their connection to that site. That is, the Enquiry application allows the user to execute the command for remembering a defined event or location on the Internet. When the user comes back to the site, the user can go and look at the things marked for remembering. Or the user may want to ask a question. The Enquiry application permits the user to look at the questions the user previously asked and the answers that the user earlier received. Accordingly, the Enquiry application provides a way to gather information about a particular user, as well as for the a larger organization to which the user may belong, such as a company, to also view the information.

Other applications include the Search, Forum, Library, and SelfHelp applications. The Search application permits searching and viewing all of the content of all the pages. The Forum application allows the user to post information to a newsgroup, for example, whereby the user can refer to what other people have posted. Also, the Forum application permits updating an interface screen for the user for indicating to the user that new information has been added to the screen. The Library application provides a mechanism for looking at information in an organized manner. The Self-Help application provides the ability to query through an interactive process to examine all of a given site supported by the present invention, such as to answer questions using an interrogation process. All of the above applications may reside as components split between IIS® service 16 and MTS® service 14.

The attribute server 18 also provides the means for updating the various applications. This permits telling the user's browser that something has changed. Acuity attributer server 18, therefore, provides a broadcasting function for broadcasting events throughout collaborating computer processing environment 10. In collaborating computer processing environment 10, a user possesses a light-weight connection to attribute server 18, and user may use Java® or poll through IIS® service 16 for updating the relevant application.

Attribute server 18 also provides a group of channels expressing or abstracting out operations occurring in the transient storage environment that it establishes. The attribute server 18 provides a hierarchical structure in which the user may access the functions of and build communications channels. For example, a collection of nodes might represent a Text Conferencing discussion "room," where a user could "check in", "listen," occasionally "speak," and eventually "leave."

One of the attributes of a room may be the "Speak" channel, which represents the channel through which a user may direct that node information should be broadcast to other participants in the room. The Speak channel makes possible hearing and displaying information relating to what is going on in the channel.

In a "SayURL" channel, URL would be broadcast to the participants.

Each user who wants to participate in text conferencing might have a "RoomInvite" channel he listens to, which permits opening a channel off of a user's nodes that issues an invitation into a room. Thus, with the RoomInvite channel, if another user sends a room name to the user, the other user will effectively invite the user into the particular room.

The User's "Page" channel permits sending to the identified user a page. The User's "State" channel permits listening to another user's state for determining when the other user changes its state, such as when the user is busy, on-line or off-line, for example.

The "NetMeet" channel allows the user to send an invitation for other users for conducting Internet meetings with the user without having to use ILS®, for example. In the operation of the NetMeet channel, if another user sends an IP address to the user's NetMeet channel, the listening user will contact the originating user to arrange an Internet meeting.

The "DataWake™," "Available," and "Escalate" channels provide selected handshake routines for connecting the WebACD™ 20 to attribute server 18 for communications functions.

An example of the operation of collaborating computer processing environment 10 of FIG. 1 may be as follows. An example of a collaborating computer processing environment may be a multi-media communications channel between user and a given company. As such, collaborating computer processing environment 10 may be configured so that eMail interface 52, phone interface 54, and NetMeeting interface 56 monitor their respective incoming events and provide input for collaborating computer processing environment 10 to perform outgoing events.

AgentUI object 36 may login by initializing an agent object, i.e. creating a group of attributes describing the Agent's state, including a "WorkTray", in a part of the hierarchy which the WebACD 20 listens to. Thus AgentUI object 36 can make itself available to WebACD™ 20. In similar fashion, a Customer 34 would instantiate Customer state in attribute server 18 and instantiate a request for help in attribute server 18 where WebACD 20 is listening. WebACD 20 may then post an event to the Agent 36 WorkTray giving the path of the Customer 34 request for help. AgentUI object 36 also may then phone out using phone interface 58 or call a NetMeeting® channel using NetMeeting® interface 60. Either the Customer object 34 or the AgentUI object 36 may connect through phone connection 54 or 60 or through some other interface to a telephone line which will be registered with an associated PBX. So, if AgentUI object 36 makes a phone call, the PBX will notice it at the PBX service 28 and register the fact that AgentUI has picked up his telephone. Attribute server 18 will then broadcast to the collaborating computer process environment 10 that the agent is busy or doing something on the telephone.

Similarly, the agent user interface may control NetMeeting channel to register the agent with an IIS® server, which again will then be displayed transiently in attribute server. So not only is the agent primed and listening, but the system is also listening and ready to redirect things to the agent.

This example makes the flexibility of the invention manifest. Objects such as Agents and Customers expose state information in attributes without awareness of what other processes may wish to make use of said information. Similarly, processes such as WebACD can listen to events without detailed knowledge of the workings of the listened-to processes.

In the operation of the collaborating computer processing environment 10 of FIG. 1, eMail interface 52, phone interface 54, and NetMeeting® interface 56 service customer object 34 support a given user. Therefore, the user may use all of these facilities to connect to these services. Upon connecting to any of these services, communications are routed to the appropriate collaborating computer process from customer object 34 to IIS® service 16. For example, in a NetMeet® channel, NetMeeting® interface 56 may connect customer object 34 to a company Website. From phone interface 54, it may be desirable for the user to access an interactive voice recognition system with which the user can send eMail or otherwise communicate beyond collaborating computer processing environment 10.

The idea here is that the various interfaces associating with customer object 34 make it possible to cross boundaries of the different eMail, phone, NetMeeting®, or other communication processes. The present invention, therefore, may encourage users to access a Website to conduct an interactive session. Whichever way the user may enter the Website, the present invention supports the desired level of computer process collaboration. Moreover, if the user directly enters a company Website, the Website may encourage enhancement of the dialogue with the customer by either the AgentUI object 36 phoning the user through customer object 34, in order to combine voice and web-based communication, or initiating a NetMeeting request with the user.

Lines having reference numerals 62 can make a request and receive a response ("set" or "get"). That is all the user can perform on these lines. Lines having reference numerals 64, on the other hand, permit the user to make a request, receive a response ("get"), as well as to receive another response that the user may not have requested ("listen"). On lines designated 64, therefore, attribute server 18 communicate to the user in a two-way communication, whereas lines designated 62 provide only a request response communication.

FIG. 2 illustrates operations of the transient storage system with an exemplary (text conferencing) Room 92 with a "sayURL" command 90 interpreted by RoomMaker 66 function according to the teachings of the present invention and provides an explanation of operations occurring within attribute server 18. In FIG. 2, attribute server 18 transiently stores hierarchical organization, which includes in this example nodes 70 through 82. In hierarchical organization 68, for example, node 70 may be considered a root node, with nodes 72, 74, and 76 serving as subnodes from root node 70. In addition, nodes 78 through 82 are subnodes from node 72 and root node 70. Node 80 communicates to iAttributeListeners 46, while node 82 receives data from iAttributeHandler 44.

On the client side, AgentUI object 36 includes Actor object 40 that interfaces iMaker components 32, including in this example, PageMaker component 84, UserMaker component 86, and RoomMaker component 88. Roommaker component 88 communicates with Room 92.

In operation, attribute server 18 supports attributes, and a user who connects to attribute server 18 may desire to know which attributes it supports. This permits attribute server 18 to convey those attributes or the impression of them across to AgentUI 36, which serves as a client. Attributes and nodes may be expressed as a path.

A path expresses all of the user's own name, plus the name of all of the user's hierarchically antecedent nodes. Basically, a path is the user's own name qualified by all of the user's antecedents. A path name provides a manner for determining the path between the highest node any other node. The path uses the common notation which is a serialization of "X:Y:Z:A" to indicate the levels as hierarchical organization 68 descends.

Also, the unique node without a parent or superior node is called the root node 70. A "root" may have a subordinate node, for example, of that called "users" which in turn has a subordinate node called "John." The notation that the present embodiment employs for this path of nodes in this case would be the unique path: "root:users:John." This notation indicates the type of the data implicitly and its name explicitly and uniquely. The use of the colons indicates a separation to make the path better understood.

As used with attribute server 18, an attribute possesses state, but does not have any methods described on it. Rather, methods are exposed by the iMaker objects 84 86 88, which communicate with attribute server 18 to implement the methods. The user does not act directly on Actor 42, nor directly on the TCP/IP connection 42. As a result, in order to affect an attribute, the user uses an iMaker, which communicates with Actor 42. Actor 42 then packages up an action that the user wants to perform and sends it across the network to its associated iAttributeHandler 46. iAttributeHandler 46 then finds the appropriate attribute and takes the appropriate action on it.

FIG. 2 shows the different operations performed by Actor 40, of "set," "get," "listen," "stop," "link," "unlink," "remove," "say," and "tell." The operations of these various Actors 46 is as follows: Suppose the user desires to set a path and breaks down the path into each level of the hierarchy. To do this, the user may, for example, start from the root node "root:" and it will find the root node, such as node 70. It will then find the subnode of the "root" node, as, for example node 72, which may have the name, "users." The name "John" may be the node name below the "users" node, e.g., node 74. Below the node named "John," the user may desire to set an "age" attribute at the value "32." This can be done using the "set" operation. Therefore, the user can issue the command "set root:users:John:age 32" to express that there was a node "John" and that his "age" attribute was 32 years.

The "get" operation provides a search function for the path, through which user may obtain a value, with the "[depth]" parameter designating how far down in the layers the searching is to occur. The "listen" actor provides a function that finds the path to which user desires to listen. This may be any of the nodes on the paths that have previously been set, or will create the node named if it did not exist. The "stop" operation removes the user from the list of processes who are listening to a particular path. The "link" and "unlink" operations provide a mechanism to inject a user's path name into a room or other collection, for example. By linking to the particular room, the user may declare an extended path. Then, the value of that path serves as the user's own path into the room. The "remove" operation removes the identified attribute and notifies all the listeners that that attribute has been removed.

The "say" and "tell" operations provide somewhat the same function, but each in a different manner.

The "say" and "tell" actors function somewhat like the "set" actor. The "say" actor merely goes to the identified path, resolves the path and finds the attribute. Then the "say" actor uses the listener list of that attribute to broadcast the value on which the "say" actor is to act, going up the hierarchical organization. The "tell" actor does essentially the same thing, but goes down the hierarchical organization to all the subordinate nodes of a path, and broadcasts to all the listeners of each subordinate node. Accordingly, if the user executes a "tell" operation to the root node of the collaborating computer processing environment, then all listeners to the system would hear that "tell" command.

There is a secondary set of operations, not disclosed in this application, for limiting and controlling who may perform which operations on each node. These "Access Control" operations will be the subject of a subsequent application The Roommaker commands of the present invention include the "addRoom," "enterRoom," "leaveRoom," "speak," and "sayURL" RoomMaker commands. FIG. 2 shows the RoomMaker and other iMakers connected into an Actor which communicates with the attribute server. In the AgentUI 36, for example open window 92 representing the room with the "sayURL" RoomMaker command 90 installed. In this room, for example, the user may desire to share a browser image with other users in the room. For this operation, the user identifies the website to be shared and passes its description to RoomMaker component 88 with the "sayURL" command 90. The RoomMaker "sayURL" command 90 will be passed by Actor 40 via TCP/IP 42 to iAttributeHandler 44 in attribute server 18. The "sayURL" command 90 will then be broadcast to all the iAttributeListeners 49 of the node relating to the specified room, as well as to the parent nodes 80, 78, 72, and 70. This permits any process listening to that room, for example other users, to be notified of changes to the URL through their respective iAttributeHandler 44. When a change occurs, the change will be detected RoomMaker component 88. In effect, therefore, this chain of events permits shared browsing using the sayURL RoomMaker command 90.

The Node commands include the "getpath" and "getvalue" commands. These commands express the fact that every attribute has a path and a value. In order to be able to use a node, the user calls an iMaker with the node. In order to make the iMaker light-weight when the user downloads it from the server, the complexity of the product should be in the RoomMaker component 88, and not in the associated user 92. This permits the RoomMaker 88 code to be reused with many different rooms 92.

FIG. 3 depicts a manager connection operation occurring in association with the transient data storage functions of the present invention. In the present embodiment, the manager connection operations occur in MTS® service 14 and are communicated to TCP/IP connection 42 through Actor 94 and ADO/OLE database 96. Components in MTSO service 14 include DataWakeMgr component 98, EnquiryMgr component 100, and UserMgr component 102. Attribute server 18 contains no information intrinsically, other than what is in its configuration file. Therefore, when a user logs on and tries to generate a set of attributes for itself, there is the need for a way for the attribute server 18 to gather data. This is performed in the present embodiment with UserMgr component 102. UserMgr component 102 creates the attributes in attribute server 18 for the user and sends this information back to either permit the user to log on or deny the user access. Therefore, attribute server 18 is configured to know the source location for the desired data, but does not persistently store any data itself.

EnquiryMgr component 100 is similar to UserMgr component 102 in some respects. EnquiryMgr component will notify attribute server 18 that an enquiry has been opened ("openEnquiry") or closed ("closeEnquiry") or that an article has been added ("addArticle") or removed ("removeArticle"). It will also notify WebACD™ 20 through attribute server 18 that an enquiry needs to be escalated ("escalate") and that an AgentUI object 36 needs to help the respective user. EnquiryMgr component 100 also provides the function such as "getArticle," "removeArticle," "listEnquiries," which are done to the database.

DataWakeMgr component 98 also operates similar to UserMgr component 102, in that when a user accesses a Website, DataWakeMgr component 98 opens a session ("openSession") on their behalf. When that session times out, it will be closed ("closeSession") on their behalf. When they go to a particular possible website, a ripple will be added ("addRipple") to their DataWake, which basically means an event has occurred with this user. The "listsession" function calls on the DataWakeMgr component 98 to present what has been done in a particular session.

In FIG. 3 it can be seen that, just in there is an Actor 40 for the AgentUI 36, there is an Actor 94 resource dispenser inside MTS® service 14 which the different iMgr components may use to act upon attribute server 18 in essentially the same way that which the AgentUI 36 or another client would act. Arrows 104 indicate the links between the different managers. Arrows 106 show a connection to the ADO/OLE DB database interface 96 for database 12, while arrow 108 represents the connection to attribute server 18.

FIG. 4 conceptually presents the way in which each process in collaborating computer processing environment 10 may be identified with a path. In attribute server 18, the circle around node 74, here called "C," means that a user is logging on as node C. An identification process may occur as follows: In order to express their full path, the user would "logon:" at initial state 110 with the name "root:B:C," for example, at step 112. Attribute server will then reply with a password challenge at step 114. Actor 40 will return the <password> at step 116. If the proper password is given, then attribute server 18 will send the user the response "ok logon root:b:c" and the number of the session that has been created on the user's behalf at step 118. Then attribute server 18 will also tell the user the utc date for when the user began and the user's IP address. This, therefore, is the dialogue that occurs when the user logs on.

FIG. 5 graphically describes the initialization from a file function that the present invention provides (refer also to FIG. 3). In FIG. 5, the UserMgr component 102 requests, at step 1, to be informed of any activity in anything at or below node 72, having the path "root:user." At step 2, the path for node 74, having the path "root:users:Ethel" is created. UserMgr component 102 is then informed, at step 3, that the root:users:Ethel path was created. UserMgr component 102, therefore, retrieves through ADO/OLE DB interface 96 the position data associated with the user, Ethel, and inserts her eMail address (node 76) in the hierarchical organization 68 from an associated persistent storage location such as database 12 of FIG. 12, at step 4, by directing SQL to fetch Ethel's record. At step 5, UserMgr component 102 issues the command to set the path root:users:Ethel:eMail to the value Ethel@foo.bar. This is transmitted over TCP/IP connection 42 to attribute server 18, which, at step 6, sets the node root:users:Ethel:eMail to the value Ethel@foo.bar.

The attribute server 18, allows the user to use a centralized configuration that permits extending the network so that servers may connect to the attribute server in a very lightweight way. In the same manner in which IIS® service 16 provides a light-weight service allowing users to meet on the Internet, attribute server 18 facilitates other services talking to each other. In this configuration, the key path for client 142 connecting to processing environment 140 is through attribute server 18. Attribute server 18 passes through information and commands to the different application servers 146 and 148, and backend server 144.

Attribute server 18, therefore, serves as a notification channel for notifying and locating the various application, backend, and database servers that support an environment such as processing environment 18.

As FIG. 6A depicts, without attribute server 18 of the present invention, client 122 must send data to numerous applications, each potentially using a different protocol. As a result of the potentially many connections and protocols existing between application servers 124, 126, and 128, and backend servers 130 and 132, and database server 134, the amount of information that the user must package into protocol structured messages, and then unpackage from protocol structured messages, as well as all the different ways in which they have to interact results in a tremendous traffic burden. This complexity makes development difficult to achieve and normal operations difficult to maintain. Further, adding new functionality is difficult because many protocol handlers may have to be modified as new features or changes arise.

FIG. 6B shows that the present invention substantially simplifies the above problem, because two protocols are used, one for persistent data storage (i.e., SQL) and one for transient data storage (i.e., attribute server protocol), irrespective of the number back-end servers back and irrespective of the number of application servers. Moreover, with the present invention, the client and servers all communicate using the same protocol. Alternative embodiments of the present invention may all use protocols other than SQL.

With the present invention, IIS® service 16 may be used as application server 146, for example, and the Rooms application may be application server 148, an application server 3 may be a pager, and so forth. The user would have to have clients that implement all three protocols. In processing environment 140, therefore, all applications and all clients can talk to each other through the attribute server by instantiating iMakers.

In summary, the present invention provides a way to transiently store data by creating a facility for listening that develops a dynamic conversation within a system of collaborating computer processes. The hierarchical organization of the present invention, while providing a naming convention, also provides a path so that something may be set node values at lower levels of the hierarchical organization and broadcast upward to the highest levels of the hierarchical organization.

Although the present invention has been described in detail, it should be understood that various changes, substitutions and alterations can be made hereto without departing from the spirit and scope of the invention as defined in the appended claims.

What is claimed is:

1. A memory-resident transient data storage system for storing data associated with a plurality of collaborating computer processes, wherein selected ones of said computer processes collaborate with other ones of said collaborating computer processes, comprising:

instructions for dynamically establishing a hierarchical organization relating to a plurality of nodes, each one of said plurality of nodes for establishing a path with at least selected ones of said plurality of collaborating computer processes;

instructions for describing a plurality of said paths according to said hierarchical organization for generating a plurality of hierarchical path descriptions between selected ones of said plurality of nodes and said at least selected ones of said plurality of collaborating computer processes;

instructions for communicating with a communications network server said plurality of hierarchical path descriptions for permitting transient storage of data for describing said paths between said nodes and said plurality of collaborating computer processes.

2. The storage system of claim 1, wherein said hierarchical path descriptions comprise descriptions and locations of individual ones of said plurality of nodes and individual ones of said plurality of collaborating computer processes.

3. The storage system of claim 2, wherein said hierarchical path descriptions further comprise descriptions of selected operations occurring between individual ones of said plurality of nodes and individual ones of said plurality of computer processes.

4. The storage system of claim 1, wherein at least one of said processes comprises a node employing TCP/IP protocols.

5. The storage system of claim 1, wherein said instructions for communicating with the communications network server further comprise instructions for transmitting said hierarchical path descriptions asynchronously upward said hierarchical organization.

6. The storage system of claim 1, wherein said instructions for communicating with the communications network server further comprise instructions for receiving asynchronously said hierarchical path descriptions from downward said hierarchical organizations.

7. The storage system of claim 1, wherein said instructions for communicating with a communications server, further comprise instructions for listening to a hierarchically designated set of said plurality of nodes.

8. The storage system of claim 7, wherein said hierarchically designated set of said plurality of nodes comprises the set of all nodes having a lower position on said hierarchical organization than said a predetermined one of said nodes.

9. The storage system of claim 8, further comprising instructions for communicating with at least one of said processes for instantiating transient data from data stored persistently in a persistent storage location.

10. The storage system of claim 1, wherein said instructions for describing a plurality of said paths according to said hierarchical organization further comprise instructions for generating a hierarchical path description for each of said plurality of nodes and each of said plurality of computer processes actively collaborating with one another.

11. The storage system of claim 10, wherein said instructions for communicating with a communications server, further comprise instructions for telling a hierarchically designated set of said plurality of nodes events relating to a single one of said plurality of nodes.

12. The storage system of claim 10, wherein said hierarchically designated set of said plurality of nodes comprises the set of all nodes having a higher position on said hierarchical organization than said single one of said plurality of nodes.

13. The storage system of claim 10, wherein said hierarchically designated set of said plurality of nodes comprises the set of all nodes actively listening to said single one of said plurality of nodes.

14. The storage system of claim 1, wherein said instructions for describing a plurality of said paths further comprise instructions for dynamically adding hierarchical path descriptions between said plurality of nodes and said plurality of computer processes in the event that computer processes are added dynamically to said plurality of collaborating computer processes.

15. The storage system of claim 1, wherein said instructions for describing a plurality of said paths further comprise instructions for removing hierarchical path descriptions between said plurality of nodes and said plurality of computer processes upon the termination of collaboration of at least one of said plurality of computer processes with other ones of said plurality of computer processes.

16. The storage system of claim 1, wherein said instructions for dynamically establishing a hierarchical organization further comprise instructions for removing hierarchical path descriptions between said plurality of nodes and said plurality of computer processes upon the termination of collaboration of a computer process with said plurality of computer processes.

17. The storage system of claim 1, wherein said instructions for dynamically establishing a hierarchical organization further comprise instructions for potentially establishing a node upon said communicating instructions attempting to communicate with said node.

18. The storage system of claim 1, wherein said instructions for dynamically establishing a hierarchical organization, said instructions for describing a plurality of said paths and said instructions for communicating with the communications network server employ a single predetermined protocol.

19. The storage system of claim 1, wherein said instructions for dynamically establishing a hierarchical organization, said instructions for describing a plurality of said paths and said instructions for communicating with the communications network server employ a single protocol using a minimal socket set for said plurality of collaborating computer processes.

20. The storage system of claim 19, wherein said minimal socket set comprises a single socket.

21. The storage system of claim 1, wherein said plurality of collaborating computer processes operate on a single computer.

22. The storage system of claim 1, wherein said plurality of collaborating computer processes operate on a plurality of associated computers.

23. A method for storing data associated with a plurality of collaborating computer processes, wherein selected ones of said computer processes collaborate with other ones of said collaborating computer processes, comprising the steps of:
dynamically establishing a hierarchical organization relating to a plurality of nodes, each one of said plurality of nodes establishing a path with at least selected ones of said plurality of computer processes;
describing a plurality of said paths according to said hierarchical organization for generating a plurality of hierarchical path descriptions between selected ones of said plurality of nodes and said at least selected ones of said plurality of computer processes;
communicating with a communications network server said plurality of hierarchical path descriptions for permitting the transient storage of data associated with at least one of said paths.

24. The data storage method of claim 23, wherein said hierarchical path describing step further comprises the step of describing and locating individual ones of said plurality of nodes and individual ones of said plurality of computer processes.

25. The data storage method of claim 23, wherein said hierarchical path describing step further comprises the step of describing selected operations occurring between individual ones of said plurality of nodes and individual ones of said plurality of computer processes.

26. The data storage method of claim 23, wherein at least one of said processes comprises a node employing a TCP/IP protocol.

27. The data storage method of claim 23, wherein said communicating step further comprises the step of transmitting said hierarchical path descriptions asynchronously upward said hierarchical organization.

28. The data storage method of claim 23, wherein said communicating step further comprises the step of receiving asynchronously said hierarchical path descriptions from downward said hierarchical organizations.

29. The data storage method of claim 23, wherein said communicating step further comprises the step of listening to a hierarchically designated set of said plurality of nodes.

30. The data storage method of claim 29, wherein said hierarchically designated set of said plurality of nodes comprises the set of all nodes having a lower position on said hierarchical organization.

31. The data storage method of claim 30, further comprising communicating step further comprises the step instantiating said transiently stored data with data stored persistently in a persistent storage location.

32. The data storage method of claim 23, wherein said describing step further comprises the step of generating a hierarchical path description for each of said plurality of nodes and each of said plurality of computer processes actively collaborating with one another.

33. The data storage method of claim 23, wherein said communicating step further comprises the step of telling a hierarchically designated set of said plurality of nodes events relating to a single one of said plurality of nodes.

34. The data storage method of claim 33, wherein said hierarchically designated set of said plurality of nodes comprises the set of all nodes having a higher position on said hierarchical organization.

35. The data storage method of claim 33, wherein said hierarchically designated set of said plurality of nodes comprises the set of all nodes actively listening to said single one of said plurality of nodes.

36. The data storage method of claim 23, wherein said describing step further comprises the step of dynamically adding hierarchical path descriptions between said plurality of nodes and said plurality of computer processes in the event that computer processes are added dynamically to said plurality of computer processes.

37. The data storage method of claim 23, wherein said describing step further comprises the step of removing hierarchical path descriptions between said plurality of nodes and said plurality of computer processes upon the termination of collaboration of at least one of said plurality of computer processes with other ones of said plurality of computer processes.

38. The data storage method of claim 23, wherein said dynamically establishing step further comprises the step of removing hierarchical path descriptions between said plurality of nodes and said plurality of computer processes upon the termination of collaboration of a computer process with said plurality of computer processes.

39. The data storage method of claim 23, wherein said dynamically establishing step further comprises the step of potentially establishing a node upon said instructions for communicating with the communications network server said plurality of hierarchical path descriptions attempting to communicate with said node.

40. The data storage method of claim 23, wherein said dynamically establishing step further comprises the step of describing a plurality of said paths and communicating with the communications network server employ a single predetermined protocol.

41. The data storage method of claim 23, wherein said dynamically establishing step further comprises the step of describing a plurality of said paths and communicating with the communications network server employ a single protocol employing a single socket for said plurality of collaborating computer processes.

42. The data storage method of claim 23, wherein said plurality of collaborating computer processes operate on a single computer.

43. The data storage method of claim 23, wherein said plurality of collaborating computer processes operate on a plurality of computers.

44. A collaborating system of memory-resident transient data storage instructions for storing data associated with a plurality of collaborating computer processes, wherein selected ones of said computer processes collaborate with other ones of said collaborating computer processes, comprising:

instructions for dynamically establishing a hierarchical organization relating to a plurality of nodes, each one of said plurality of nodes establishing a path with at least selected ones of said plurality of collaborating computer processes, said hierarchical organization establishing instructions residing at a first location;

instructions for describing a plurality of said paths according to said hierarchical organization for generating a plurality of hierarchical path descriptions between selected ones of said plurality of nodes and said at least selected ones of said plurality of collaborating computer processes, said path describing instructions residing at a second location different from said first location; and instructions for communicating with a communications network server said plurality of hierarchical path descriptions for permitting transient storage of data that describes the paths between said nodes and said plurality of collaborating computer processes.

45. The collaborating system of claim 44, wherein said communicating instructions reside at a third location different from said first location and second location.

46. The collaborating system of claim 44, wherein said hierarchical path descriptions comprise descriptions and locations of individual ones of said plurality of nodes and individual ones of said plurality of computer processes.

47. The collaborating system of claim 44, wherein said hierarchical path descriptions further comprise descriptions of selected operations occurring between individual ones of said plurality of nodes and individual ones of said plurality of computer processes.

48. The collaborating system of claim 44, wherein at least one of said processes comprises a node employing TCP/IP protocols.

49. The collaborating system of claim 44, wherein said instructions for communicating with the communications network server further comprise instructions for transmitting said hierarchical path descriptions asynchronously upward said hierarchical organization.

50. The collaborating system of claim 44, wherein said instructions for communicating with the communications network server further comprise instructions for receiving asynchronously said hierarchical path descriptions from downward said hierarchical organizations.

51. The collaborating system of claim 44, wherein said instructions for communicating with a communications server, further comprise instructions for listening to a hierarchically designated set of said plurality of nodes.

52. The collaborating system of claim 51, wherein said hierarchically designated set of said plurality of nodes comprises the set of all nodes having a lower position on said hierarchical organization.

53. The collaborating system of claim 51, further comprising instructions for communicating with at least one of said processes for instantiating transient data from data stored persistently in a persistent storage location.

54. The collaborating system of claim 44, wherein said instructions for describing a plurality of said paths according to said hierarchical organization further comprise instructions for generating a hierarchical path description for each of said plurality of nodes and each of said plurality of computer processes actively collaborating with one another.

55. The collaborating system of claim 44, wherein said instructions for communicating with a communications server, further comprise instructions for telling a hierarchically designated set of said plurality of nodes events relating to a single one of said plurality of nodes.

56. The collaborating system of claim 55, wherein said hierarchically designated set of said plurality of nodes comprises the set of all nodes having a higher position on said hierarchical organization.

57. The collaborating system of claim 55, wherein said hierarchically designated set of said plurality of nodes comprises the set of all nodes actively listening to said single one of said plurality of nodes.

58. The collaborating system of claim 44, wherein said instructions for describing a plurality of said paths further comprise instructions for dynamically adding hierarchical path descriptions between said plurality of nodes and said plurality of computer processes in the event that computer processes are added dynamically to said plurality of computer processes.

59. The collaborating system of claim 44, wherein said instructions for describing a plurality of said paths further comprise instructions for removing hierarchical path descriptions between said plurality of nodes and said plurality of computer processes upon the termination of collaboration of at least one of said plurality of computer processes with other ones of said plurality of computer processes.

60. The collaborating system of claim 44, wherein said instructions for dynamically establishing a hierarchical organization further comprise instructions for removing hierarchical path descriptions between said plurality of nodes and said plurality of computer processes upon the termination of collaboration of a computer process with said plurality of computer processes.

61. The collaborating system of claim 44, wherein said instructions for dynamically establishing a hierarchical organization further comprise instructions for potentially establishing a node upon said instructions for communicating with the communications network server said plurality of hierarchical path descriptions attempting to communicate with said node.

62. The collaborating system of claim 44, wherein said instructions for dynamically establishing a hierarchical organization, said instructions for describing a plurality of said paths and said instructions for communicating with the communications network server employ a single predetermined protocol.

63. The collaborating system of claim 44, wherein said instructions for dynamically establishing a hierarchical organization, said instructions for describing a plurality of said paths and said instructions for communicating with the communications network server employ a single protocol employing a single socket for said plurality of collaborating computer processes.

64. The collaborating system of claim 44, wherein said plurality of collaborating computer processes operate on a single computer.

65. The collaborating system of claim 44, wherein said plurality of collaborating computer processes operate on a plurality of computers.

* * * * *